United States Patent [19]

Campbell, III et al.

[11] Patent Number: 4,686,569
[45] Date of Patent: Aug. 11, 1987

[54] CIRCUITRY FOR REDUCING DEMODULATION PHASE ERROR AS FOR AN AUTOMATIC DEGHOSTING SYSTEM

[75] Inventors: Edward R. Campbell, III, Tabernacle Township, Burlington County; Henry G. Lewis, Jr., Hamilton Square, both of N.J.

[73] Assignee: RCA Corporation, Princeton, N.J.

[21] Appl. No.: 868,113

[22] Filed: May 29, 1986

[51] Int. Cl.$^4$ .............................................. H04N 5/21
[52] U.S. Cl. ................................... 358/167; 358/905; 358/35
[58] Field of Search ................. 358/167, 166, 160, 36, 358/37, 35, 188, 191.1, 195.1, 905

[56] References Cited

U.S. PATENT DOCUMENTS

| 4,047,224 | 9/1977 | Yamaguti | 358/166 |
| 4,261,016 | 4/1981 | Hongu | 358/191.1 |
| 4,285,006 | 8/1981 | Kurahashi et al. | 358/35 |
| 4,374,400 | 2/1983 | Holmes | 358/167 |
| 4,584,652 | 4/1986 | Sturza et al. | 364/484 |

FOREIGN PATENT DOCUMENTS 80132 7/1978 Japan ...................................... 358/35

OTHER PUBLICATIONS

Thedick, H. "Adaptive Multipath Equalization for T.V. Broadcasting", IEEE Trans. on Consumer Electronics, May 1977, pp. 175–181.

Primary Examiner—Tommy P. Chin
Attorney, Agent, or Firm—E. M. Whitacre; P. J. Rasmussen; K. N. Nigon

[57] ABSTRACT

An automatic deghosting system synchronously demodulates IF television signals to generate baseband composite video signals. A strong RF ghost signal having a carrier phase that differs from that of the desired signal may cause demodulation phase errors, causing quadrature distortion in the baseband video signals. The circuitry shown in this disclosure synchronously demodulates the quadrature component of the IF television signals and develops a signal proportional to the difference between the values of the baseband quadrature signal immediately before and immediately after the leading edge of the vertical sync pulse. This signal, which is proportional to the demodulation phase error, is used to control a phase locked loop that regenerates the in-phase and quadrature carrier signals used by the synchronous demodulators to substantially eliminate any demodulation phase error.

11 Claims, 9 Drawing Figures

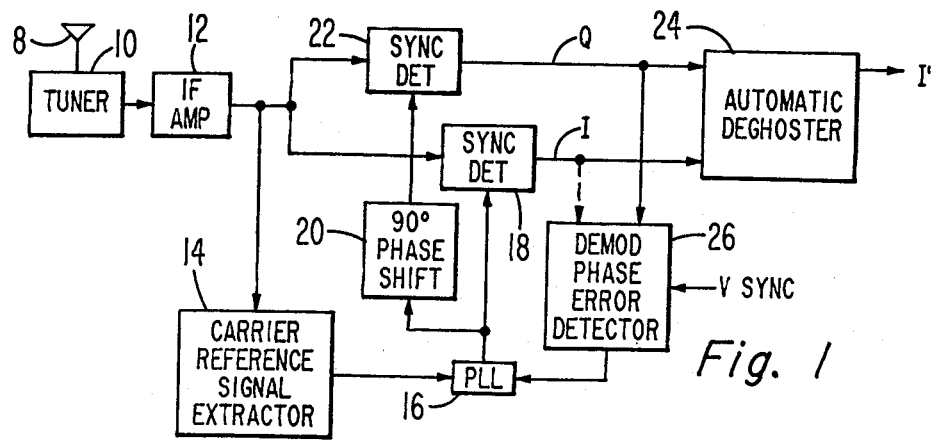
Fig. 1
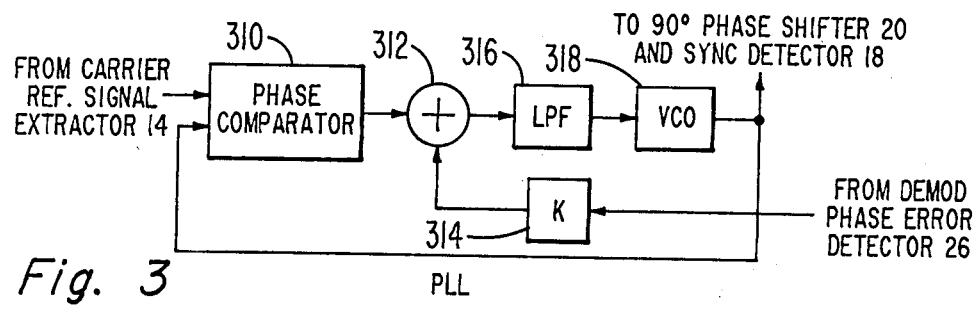
Fig. 3
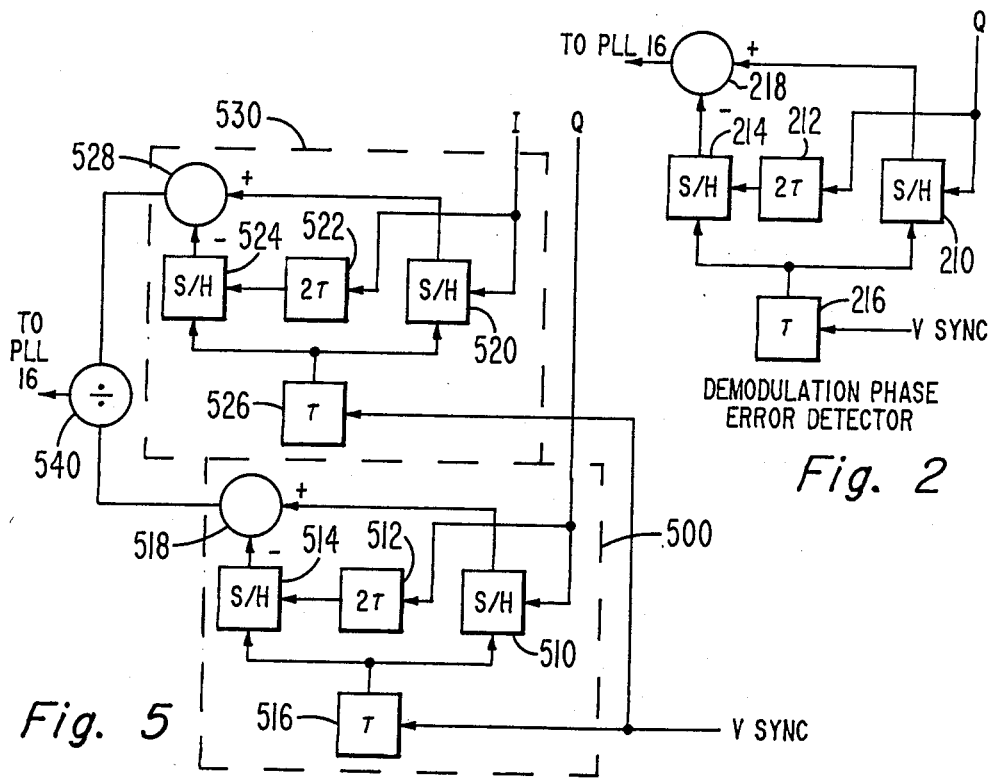
Fig. 2
Fig. 5

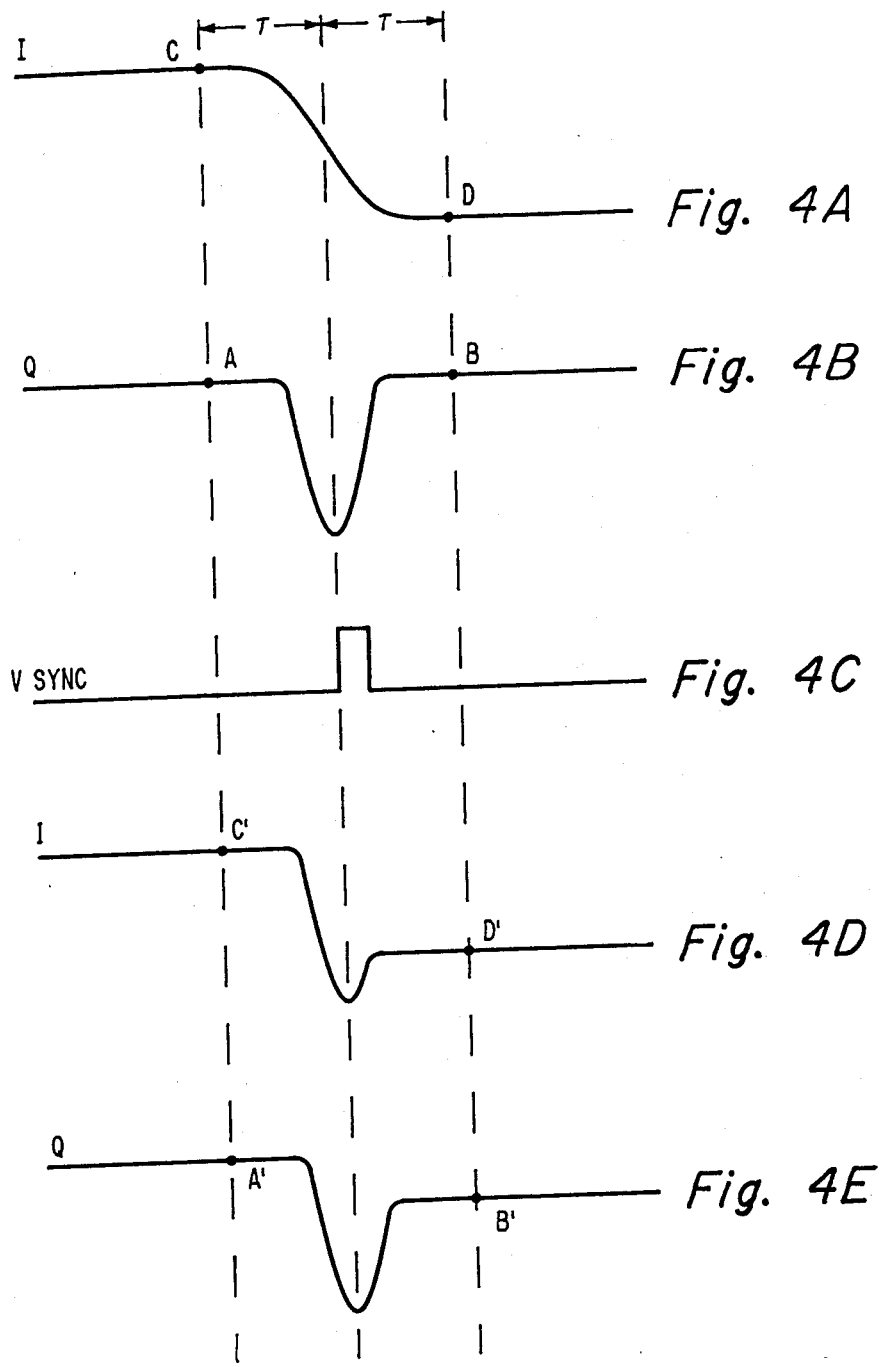

CIRCUITRY FOR REDUCING DEMODULATION PHASE ERROR AS FOR AN AUTOMATIC DEGHOSTING SYSTEM

The present invention relates to circuitry for synchronously demodulating television signals which may include multipath distortion components. The circuitry substantially compensates for phase errors in the demodulated composite video signals that are caused by the multipath distortion components.

Television reception has long been plagued by multipath distortion, the reception of undesired multiple signals. These undesired signals, reflected from buildings and other large objects or resulting from poorly terminated cable networks, appear as delayed versions of the direct television signal and are commonly referred to as ghost signals.

The ghost signals are delayed from the direct signal as a function of the relationship of the signal path lengths between the direct and ghost signals. The randomness of this relationship from one receiver location to another dictates that the phase of the ghost carrier signal may have any relationship to the phase of the direct carrier signal.

In many automatic deghosting systems the incoming television signals are synchronously demodulated in phase with the picture carrier signal. Exemplary systems of this type are described in the article entitled "Adaptive Multipath Equalization for T.V. Broadcasting", IEEE Transactions on Consumer Electronics, May 1977, pp. 175-181 by H. Thedick; U.S. Pat. No. 4,285,006 entitled, "Ghost Cancellation Circuit System"; and U.S. Pat. No. 4,374,400 entitled "Television Ghost Cancellation System with Ghost Carrier Phase Compensation", which are hereby incorporated by reference.

In a typical systems of this type, the picture carrier signal is extracted from the modulated television signals provided by the intermediate frequency (IF) amplifier. This carrier signal is used to synchronize a phase locked loop which provides a regenerated carrier signal. A synchronous detector is responsive to this regenerated carrier signal and to the modulated television signals provided by the IF amplifier to develop a baseband composite video signal.

When the incoming television signals include a relatively strong ghost signal component having a carrier phase that is not the same as the carrier phase of the direct signal, the baseband composite video signal developed by this method may be distorted. This distortion occurs because the carrier signal of the incoming television signal is the vector sum of the direct and ghost carrier signals and, consequently, has a different phase than the direct carrier signal. When the extracted carrier signal is used to synchronously demodulate the television signals provided by the IF amplifier, the resulting baseband signals are distorted by crosstalk from the quadrature component of the modulated television signals. Since television signals are vestigal sideband modulated signals, this quadrature component is the Hilbert transform of the in-phase components having frequencies greater than 1 MHz. The distortion caused by this quadrature component may appear as excessive peaking of vertical edges in the reproduced image or as an apparent loss of horizontal resolution depending on whether the quadrature component tends to reinforce or cancel the respective in-phase component.

SUMMARY OF THE INVENTION

The present invention is circuitry for synchronously demodulating radio frequency (RF) television signals which may include multipath distortion components. The circuitry includes a filter for extracting the carrier signal from RF television signals. The extracted carrier signal is applied to circuitry which generates a signal that is locked in a quadrature phase relationship with the extracted carrier signal. The quadrature signal is applied to a synchronous detector which develops a baseband signal, Q, that represents the quadrature components of the RF television signal. The baseband Q signal is applied to a demodulation phase error detector which produces a control signal that is proportional to any error in the phase of the signal provided by the phase locking circuitry. This control signal is applied to the phase locking circuitry to adjust the phase of the signals provided thereby in a sense which tends to reduce this error.

BRIEF DESCRIPTION OF THE DRAWINGS

FIG. 1 is a block diagram of a portion of a television receiver including an embodiment of the present invention.

FIG. 2 is a block diagram of a demodulation phase error detector which may be used in the portion of the television receiver shown in FIG. 1.

FIG. 3 is a block diagram of a phase locked loop which may be used in the portion of the television receiver shown in FIG. 1.

FIGS. 4A-4E are waveform diagrams of amplitude versus time that are useful in explaining the operation of the portion of the television receiver shown in FIG. 1.

FIG. 5 is a block diagram of an alternative demodulation phase error detector which may be used in the portion of the television receiver shown in FIG. 1.

DETAILED DESCRIPTION

Referring to FIG. 1, RF signals are received by an antenna 8 and applied to tuner circuitry 10. The tuner circuitry 10, which may be of conventional design, heterodynes the RF signals with a signal developed by a local oscillator to develop IF signals, which include composite video signals modulating an IF carrier. These IF signals are amplified by an IF amplifier 12 and applied to carrier reference signal extracting circuitry 14. The circuitry 14 may, for example, be a conventional band-pass filter having a narrow-bandwidth frequency response characteristic centered about the IF carrier frequency. The signal provided by the circuitry 14 is the IF carrier signal to the relative exclusion of any modulation components. This carrier signal is applied to a PLL 16 which may, for example generate an oscillatory signal having the same frequency as, and locked in phase to the IF carrier signal. The PLL 16 is described in more detail in reference to FIG. 3, below. The signal generated by the PLL 16 is applied to one input terminal of a synchronous detector 18 and to 90° phase shifting circuitry 20. The circuitry 20 develops a signal that is quadrature phase related to the regenerated carrier signal provided by the PLL 16. This quadrature carrier signal is applied to one input terminal of a synchronous detector 22. The synchronous detectors 18 and 22 may, for example, multiply the IF signal by the respective in-phase and quadrature phase carrier signals to generate baseband signals (I and Q) representing the in-phase and quadrature phase modulation signal components of the IF signals respectively. The I and Q signals are applied to automatic deghosting circuitry 24. The deghosting circuitry 24, which may, for example, be similar to that set forth in the Thedick article or the U.S. patents referenced above, processes the I signal to substantially remove multipath distortion components and provides a deghosted signal, I', at its output terminal.

As set forth above, ghost signals having carrier phases which differ from the carrier phase of the direct signal may cause the carrier phase of the incoming signals to be different than that of the direct signal. This difference in phase propagates through the tuner 10 and IF amplifier 12 so the phase of the carrier signal extracted by the circuitry 14 may not match the phase of the IF carrier of the direct signal. Since the signals developed by the PLL 16 are locked in phase to the extracted carrier signal, the I signal developed by the synchronous detector 18 may include crosstalk components from the quadrature component of the direct signal and the Q signal developed by the synchronous detector 22 may include crosstalk components from the in-phase component of the direct signal. Moreover, since the automatic deghosting circuitry 24 does not correct the crosstalk distortion, the signal I' provided by the deghoster 24 may also be distorted.

The effects of this distortion are shown in FIGS. 4A, 4B, 4D, and 4E. FIGS. 4A and 4B are waveform diagrams representing, respectively, the in-phase and quadrature phase components of the leading edge of the vertical synchronization pulse for the direct signal. The leading edge of vertical sync is a training signal generally used by automatic deghosting systems. None of the waveforms shown in FIGS. 4A–4E include any ghost signal components. In the present embodiment, the ghost signals causing the demodulation phase errors are assumed to be delayed from the direct signal by an amount of time greater than $2\tau$, the amount of time between the points A and B on the waveform 4B. As shown in FIG. 4A, the in-phase component of the direct signal is a smooth monotonic transition from a value corresponding to black level to a value corresponding to the sync tip level. The waveform shown in FIG. 4B is the quadrature phase component of the signal, the Hilbert transform of the components of signal shown in FIG. 4A having frequencies greater than 1 MHz.

FIGS. 4D and 4E show the effects of demodulation phase errors on the I and Q signals. In FIG. 4D, the I waveform of the direct signal is no longer monotonic and the Q waveform has different levels before and after the leading edge of vertical sync. It is this distortion of the quadrature component of the leading edge of the vertical sync pulse that is used by the present embodiment of the invention to detect and correct demodulation phase errors.

Referring to FIG. 1, the Q signal provided by the synchronous demodulator 22 is applied to one input terminal of a demodulation phase error detector 26. A signal VSYNC, which may, for example be generated by vertical synchronization signal separating circuitry (not shown) is applied another input terminal of the demodulation phase error detector 26. The signal VSYNC is shown in FIG. 4C. It may, for example, consist of a single pulse for each field which occurs substantially coincident with the leading edge of the vertical synchronization pulse component of the demodulated composite video signal.

FIG. 2 is a block diagram of a demodulation phase error detector suitable for use as the detector 26. Q signals from the synchronous detector 22 are applied to the signal input port of sample and hold circuitry 210. The signal VSYNC, delayed by an amount of time $\tau$ via the delay element 216, is applied to the control input terminal of the circuitry 210. The sample and hold circuitry 210 samples the Q signal when the control input signal is high and holds the value of this sample while the control signal is low. The value of the sample held by the circuitry 210 is applied to a first input terminal of a subtracter 218.

The Q input signal is also applied to a delay element 212 which provides a time delay substantially equal to $2\tau$ time periods. The signal provided by the delay element 212 is applied to sample and hold circuitry 214, which is controlled by the delayed VSYNC signal provided by the delay element 216. The output sample value of the sample and hold circuitry 214 is applied to a second input terminal of the subtracter 218. The subtracter 218 subtracts the sample value provided by the circuitry 214 from that provided by the circuitry 210 and applies the result to the PLL 16.

FIG. 3 is a block diagram of a PLL suitable for use as the PLL 16. Reference signals from the carrier reference signal extracting circuitry 14 are applied to one input terminal of a phase comparator 310 and the output signal of the PLL, provided by a voltage controlled oscillator (VCO) 318, is applied to the other input terminal. The output signal of the phase comparator 310 is proportional to the difference in phase between these two signals. This phase difference signal is applied to one input terminal of an adder 312, the other input terminal of which is coupled to receive the output signal of the demodulation phase error detector 26 scaled by a factor K via the scaling circuitry 314. The adder 312 applies the sum of the phase difference signal and the scaled phase error signal to the input terminal of a low-pass filter 316, the loop filter of the PLL. The low-pass filter 316 integrates the signals applied to its input terminal to produce a control signal for the VCO 318 at its output terminal. The VCO 318, which may be of conventional design, has a free running frequency approximately equal to the IF carrier frequency. The signals provided by the low-pass filter 316 adjust the frequency and phase of the signal produced by the VCO 318 until it has substantially the same frequency and phase as the direct carrier signal component of the IF signals.

To understand how this occurs, consider, once again the FIGS. 4A–4E. The waveform 4B shows the portion of the demodulated quadrature signal, Q, corresponding to the leading edge of the vertical synchronization pulse when the signal provided by the PLL 16 has the same frequency and phase as the direct carrier signal. The points A and B correspond to the values held by the sample and hold circuitry 214 and 210 respectively. Since these values are approximately equal, the signal provided by the demodulation phase error detector 26 to the PLL 16 is approximately equal to zero and does not contribute significantly to the phase error signal applied to the low pass filter 316 by the adder 312.

Alternatively, when the phase of the signal provided by the PLL 16 is not the same as the phase of the direct carrier signal, the corresponding points on the quadrature waveform, A' and B' of FIG. 4E, have different values. In this instance, the values provided by the demodulation phase error detector 26 are non-zero and contribute significantly to the phase adjustment signal developed by the adder 312. As set forth above, this signal is integrated by the low-pass filter 316 to develop a frequency control signal for the VCO 318. The amplitude and polarity of the phase adjustment signal are controlled by the phase comparison circuitry 310 and the scaling circuitry 314 to ensure that the signal provided by the VCO 318 converges to the frequency and phase of the direct carrier signal.

As set forth above, the demodulation phase error signal used by this embodiment of the invention is the difference between the values of the Q signal before and after the leading edge of the vertical synchronization pulse. For this system to perform well for signals which may have different amplitudes, it is preferable for the television system to include automatic gain control (AGC) circuitry before the demodulation phase error detector 26. This circuitry ensures that phase errors of the same magnitude produce correction signals having substantially the same magnitude.

FIG. 5 is a block diagram of a demodulation phase error detector which performs well without AGC circuitry. This demodulation phase error detector includes two circuits, 500 and 530, each of which is identical to the demodulation phase error detector described in reference to FIG. 2. The circuit 500 develops values representing the difference between the amplitude of the Q signal before and after the leading edge of vertical sync, and the circuit 530 develops values representing the difference between the amplitude of the I signal before and after the leading edge of vertical sync. The difference between the Q signal amplitude values is divided by the difference between the I signal amplitude values by a divider 540. The value provided by the divider 540 is the tangent of the phase angle between the IF carrier and the direct carrier. This value is substantially independent of the range of amplitude values occupied by the I and Q signals. The values developed by the divider 540 are applied as demodulation phase error signals to the PLL 16 as set forth above.

Basic to understanding the operation of the demodulation phase error detector are the equations describing the synchronous demodulation of the in-phase, I', and quadrature phase, Q', components of a vestigial sideband modulated signal using a regenerated carrier which differs in phase from the carrier of the modulated signal by an angle $\theta$. These well known equations may be expressed as:

$$I' = I \cos \theta - Q \sin \theta \qquad (1)$$

and $$Q' = I \sin \theta + Q \cos \theta \qquad (2)$$

where I and Q are the baseband in-phase and quadrature phase components which would be obtained if the regenerated carrier had the same phase as the carrier of the desired signal. In this instance, the desired signal is the direct signal component of the IF television signal and $\theta$ is the phase angle by which the IF carrier of the combined direct and ghost television signal differs from the IF carrier of the direct signal. Using equation (2) the values of A' and B' of FIG. 4E may be expressed as functions of the values A and B of FIG. 4B and the values C and D of FIG. 4A as:

$$A' = C \sin \theta + A \cos \theta \qquad (3)$$

$$B' = D \sin \theta + B \cos \theta \qquad (4)$$

Similarly, using equation (1), the values C' and D' of FIG. 4D may be expressed as:

$$C' = C \cos \theta - A \sin \theta \qquad (5)$$

$$D' = D \cos \theta - B \sin \theta \qquad (6)$$

The function realized by the circuitry shown in FIG. 5 may be described by the equation:

$$\tan \theta = (B' - A')/(D' - C') \qquad (7)$$

substituting the equations (3) through (6) into the equation (7) and combining like terms yields:

$$\tan \theta = ((D-C) \sin \theta + (B-A) \cos \theta)/((D-C) \cos \theta - (B-A) \sin \theta) \qquad (8)$$

From FIG. 4B it is noted that A=B. This identity is substituted into the equation (8), yielding:

$$\tan \theta = (D-C) \sin \theta / (D-C) \cos \theta$$

the factors (D−C) cancel, so the equation (9) becomes the well known identity:

$$\tan \theta = \sin \theta / \cos \theta \qquad (10)$$

Although the embodiments described above are in terms of analog signals and analog circuitry it is contemplated that the present invention may be practiced using digital signals and digital circuitry.

What is claimed is:

1. Circuitry for synchronously demodulating radio frequency television signals comprising:

an input terminal for applying a radio frequency television signal having a direct including a direct carrier signal and a delayed direct signal component including a delayed direct carrier signal, wherein said radio frequency television signal includes a carrier signal which is a vector sum of said direct carrier signal and said delayed direct carrier signal;

means coupled to said input terminal for extracting the carrier signal from said radio frequency television signal;

means, including a phase locked loop responsive to said extracted carrier signal and to a phase control signal, for generating an oscillatory signal having a frequency and phase determined by said extracted carrier signal and said phase control signal;

detection means coupled to said input terminal and responsive to said radio frequency television signal and to said oscillatory signal for generating a baseband signal representing amplitude modulated information carried by said radio frequency television signal; and means coupled to said detection means and responsive to the magnitude of said baseband signal at first and second predetermined instants for generating said phase control signal, being proportional to a phase angle by which said oscillatory signal differs from having a predetermined phase relationship with said direct carrier signal, said phase control signal tending to change, the phase of said oscillatory signal in a sense to reduce the magnitude of said phase control signal.

2. The circuitry set forth in claim 1 wherein the magnitude of the phase control signal generated by said phase control signal generating means is proportional to said phase angle by which said oscillatory signal differs from being quadrature phase related to said direct carrier signal.

3. The circuitry set forth in claim 2 wherein:
said radio frequency television signal includes a vertical field synchronizing signal component; and
said phase control signal generating means is responsive to components of the baseband signal provided by said detection means corresponding to said vertical field synchronizing signal component for generating said phase control signal.

4. The circuitry set forth in claim 3 wherein:
said vertical field synchronizing signal component includes periodic transitions; and
said phase control signal generating means includes:
means coupled to said detection means for generating, as said phase control signal, a signal proportional to the difference between the values of said baseband signal at said first instant, immediately prior to one of said periodic transitions, and at said second instant, immediately after one of said periodic transitions, respectively.

5. The circuitry set forth in claim 1 wherein said phase locked loop comprises:
a variable oscillator responsive to a frequency control signal for generating said oscillatory signal;
phase comparison means coupled to said variable oscillator for generating a phase difference signal proportional to the difference in phase between said oscillatory signal and said extracted carrier signal;
means coupled to said phase comparison means for combining said phase difference signal and said phase control signal to develop the frequency control signal for said variable oscillator.

6. Circuitry for synchronously demodulating radio frequency television signals comprising:
an input terminal for applying a radio frequency television signal having a direct signal component including a direct carrier signal and a delayed direct signal component, including a delayed direct carrier signal, wherein said radio frequency television signal includes a carrier signal which is a vector sum of said direct carrier signal and said delayed direct carrier signal;
means coupled to said input terminal for extracting the carrier signal from said radio frequency television signal;
means, including a phase locked loop responsive to said extracted carrier signal and to a phase control signal, for generating a first oscillatory signal having a frequency and phase determined by said extracted carrier signal and said phase control signal and for generating a second oscillatory signal being quadrature phase related to said first oscillatory signal;
first synchronous detection means coupled to said input terminal and responsive to said radio frequency television signal and to said first oscillatory signal for generating a first baseband signal representing amplitude modulated information carried by a first component of said radio frequency television signal;
second synchronous detection means coupled to said input terminal and responsive to said radio frequency television signal and to said second oscillatory signal for generating a second baseband signal representing amplitude modulated information carried by a second component of said radio frequency television signal, being quadrature phase related to said first component;
means, including means responsive to one of said first and second baseband signals for generating said phase control signal, being proportional to a phase angle by which said second oscillatory signal differs from being quadrature phase related to said direct carrier signal, said phase control signal tending to change the phase of said first and second oscillatory signals in a sense to reduce the magnitude of said phase control signal.

7. The circuitry set forth in claim 6 wherein:
said radio frequency television signal includes a vertical field synchronizing signal component; and
said phase control signal generating means is responsive to components of said second baseband signal corresponding to said vertical field synchronizing signal component for generating said phase control signal.

8. The circuitry set forth in claim 7 wherein:
said vertical field synchronizing signal component includes periodic transitions; and
said phase control signal generating means includes:
sample and hold means coupled to said second synchronous detection means for generating first and second samples corresponding to the values of said second baseband signal at a time immediately prior to one of said periodic transitions and at a time immediately after one of said periodic transitions respectively; and
sample subtraction means, coupled to said sample and hold means, for generating, as said phase control signal a signal proportional to the difference between said first and second samples.

9. The circuitry set forth in claim 8 wherein said phase control signal generating means includes:
further sample and hold means coupled to said first synchronous detection means for generating third and fourth samples corresponding to the values of said first baseband signal at a time immediately prior to one of said periodic transitions and at a time immediately after one of said periodic transitions, respectively;
further sample subtraction means, coupled to said further sample and hold means, for generating a signal proportional to the difference between said third and fourth samples; and
means for dividing the signal provided by the sample subtraction means by the signal provided by the further sample subtraction means to develop said phase control signal.

10. The circuitry set forth in claim 9 wherein said phase locked loop comprises:
a variable oscillator responsive to a frequency control signal for generating said first oscillatory signal;
phase comparison means coupled to said variable oscillator for generating a phase difference signal proportional to the difference in phase between said first oscillatory signal and said extracted carrier signal;
means coupled to said phase comparison means for combining said phase difference signal and said phase control signal to develop the frequency control signal for said variable oscillator.

11. Circuitry for synchronously demodulating radio frequency television signals comprising:

an input terminal for applying a radio frequency television signal having a direct signal component including a direct carrier signal vestigial sideband modulated by a baseband signal and a delayed direct signal component including a delayed direct carrier signal vestigial sideband modulated by a delayed baseband signal, wherein said radio frequency television signal includes a carrier signal which is a vector sum of said direct carrier signal and said delayed direct carrier signal;

means, coupled to said input terminal, for extracting the carrier signal from said radio frequency television signal;

means, including a phase locked loop responsive to said extracted carrier signal and to a phase control signal, for generating an oscillatory signal having substantially the same frequency and phase as said direct carrier signal;

means, coupled to said input terminal and responsive to said oscillatory signal for synchronously demodulating said radio frequency television signal to generate an output signal which includes said baseband signal to the substantial exclusion of any quadrature modulation signal components;

means, coupled to said input terminal and responsive to said oscillatory signal for generating said phase control signal, being proportional to a phase angle by which said oscillatory signal differs from having the same phase as said direct carrier signal;

wherein, said phase control signal tends to change the phase of said oscillatory signal in a sense to reduce the magnitude of said phase control signal.

* * * * *

UNITED STATES PATENT AND TRADEMARK OFFICE
CERTIFICATE OF CORRECTION

PATENT NO. : 4,686,569

DATED : 8/11/87

INVENTOR(S) : Edward R. Campbell, III, et al

It is certified that error appears in the above-identified patent and that said Letters Patent is hereby corrected as shown below:

Column 6, line 37 after the first occurrence of "direct" inset-- signal component,--

Column 6, line 22 following the equation insert (9)

Signed and Sealed this

Nineteenth Day of July, 1988

Attest:

DONALD J. QUIGG

Attesting Officer

Commissioner of Patents and Trademarks